United States Patent Office 3,245,305
Patented Apr. 12, 1966

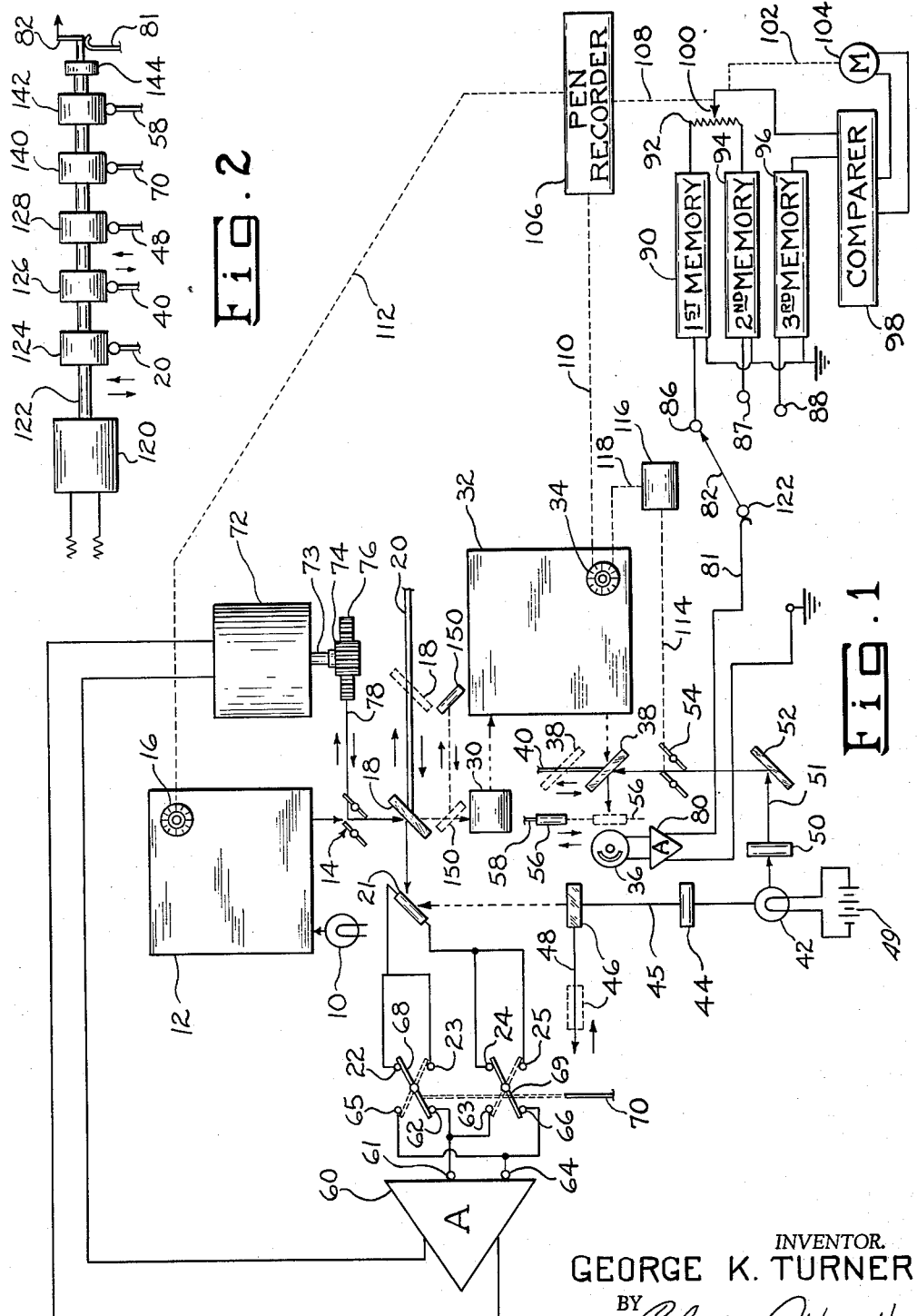

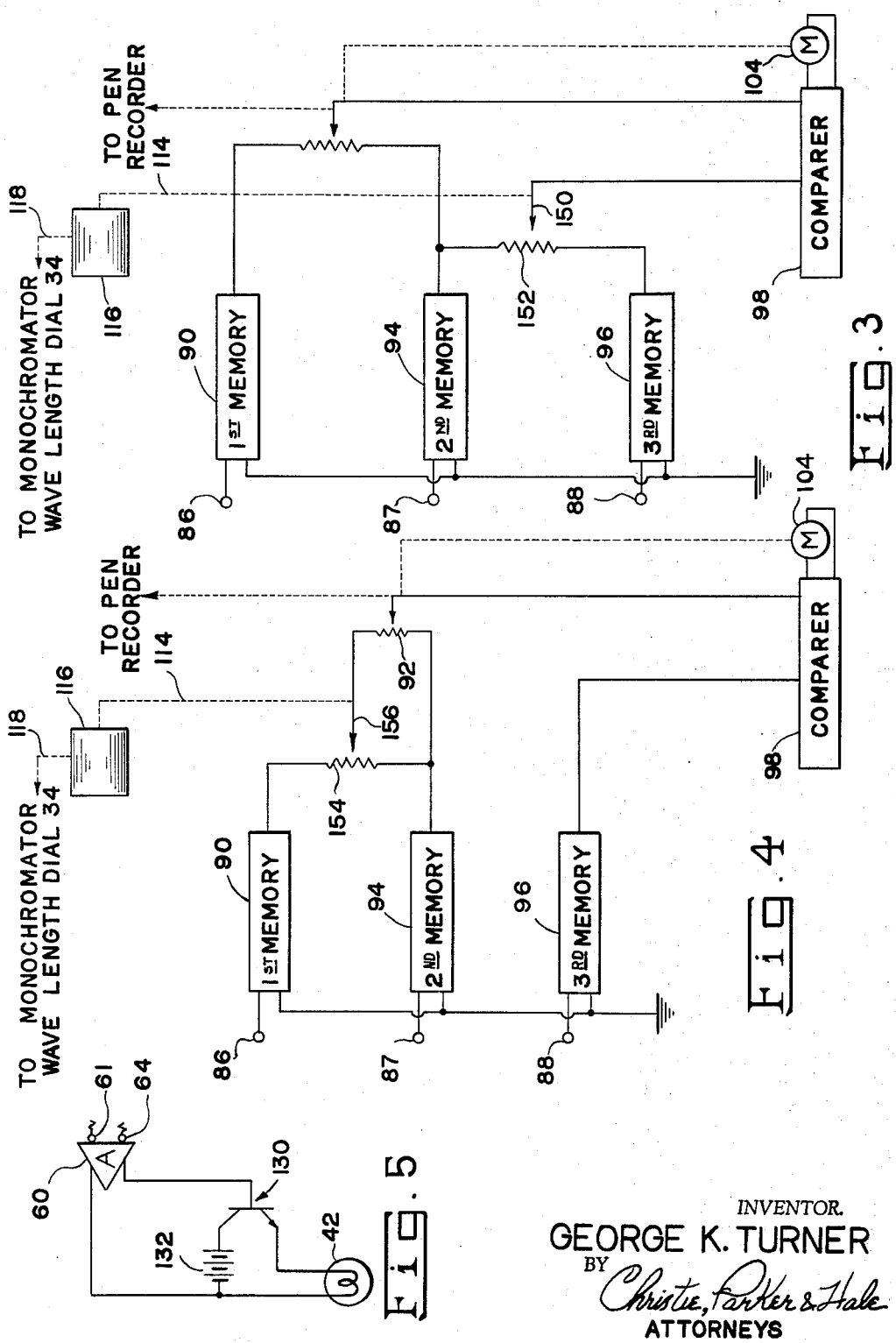

1

3,245,305
RADIATION COMPENSATION FOR LIGHT
SOURCES IN SPECTROMETRIC APPARATUS
George K. Turner, Palo Alto, Calif., assignor to G. K.
Turner Associates, Palo Alto, Calif., a corporation of
California
Filed Aug. 21, 1961, Ser. No. 132,676
8 Claims. (Cl. 88—14)

This invention relates to stabilizing a radiation source to compensate for inherent variations in the source and in elements in the system in which the source is used.

Examples of systems in which this invention is useful are spectrofluorometers and emission spectrometers. A spectrofluorometer irradiates a sample with the light at one wave length and measures the light reemitted from the sample at another wave length. An emission spectrometer measures the intensity of energy emitted at different wave lengths from a light source. Monochromators are used in spectrofluorometers and emission spectrometers to transmit selected wave lengths of light from a polychromatic source.

Unfortunately, light sources and light detectors have variable opening characteristics which depend on the age of the units, line voltage, and the wave length of the light under study. The efficiency of monochromators is also wave-length dependent. As a consequence of these variable characteristics, the final results are often subject to error.

This invention provides an automatic compensating system to reduce or substantially eliminate the source of errors previously found in spectrofluorometers and emission spectrometers.

The compensating apparatus includes a first source of radiation, a second source of radiation, and means for sensing the relative intensities of the radiation from the two sources. Means are provided for changing the intensity of the radiation from one of the sources. Means are also provided to be responsive to the sensing means for automatically changing the intensity of the radiation from the said one source to keep the ratio of the intensity of the two sources substantially constant. In one form, intensity from the other source is substantially constant so that not only the ratio of the intensity of the two sources is constant, but the output from the said one variable source is also kept constant.

In the presently preferred embodiment, one source is a simple light bulb, the output of which is kept constant by the application of a steady voltage, or is adjusted automatically by changing the voltage applied to it. In another form the radiation from the adjustable source passes through adjustable louvres which are automatically changed to keep the ratio of the intensities of the two sources constant.

When the system is used in a spectrofluorometer, a sample container is disposed in the path of the radiation from the first source, and a radiation detector is disposed in the path of light emitted from the sample. Means are provided for automatically irradiating the detector with light from the sample and from the second source. A conventional ratio recorder is connected to the detector to record the ratio of the intensities of the radiation from the sample and the radiation from the second source. Since the ratio of the intensity of the radiation from the first source to the intensity of the radiation from the second source is automatically maintained constant, the ratio of the intensities of the radiations striking the detector is dependent only on the effect of the sample on the radiation from the first source, and is independent of variations in intensity of the radiation from either the first or second sources.

In the preferred form of the invention, ratio of the radiation intensities from the first and second sources is maintained constant by alternately irradiating a thermocouple with energy from the first and second sources. The signal developed by the thermocouple is used to maintain the ratio of the two intensities constant by automatically changing the intensity of the radiation from the adjustable source, said by changing the input applied to a light bulb, or by a conventional light attenuator, such as adjustable louvres.

In using the invention in a spectrofluorometer, the first source of radiation is a first monochromator, and the radiation detector is a photocell, or any other equivalent radiation sensitive device. The second source of radiation may be either the light source that supplies light to the first monochromator or it may be a simple light bulb independent of the light source for the first monochromator.

Since photocells of suitable sensitivity for use in spectrofluorometers are dependent on the wave length of light received, and since the efficiency of monochromators is also wave length dependent, the invention preferably includes means for automatically adjusting the amount of light transmitted from the second source to the photocell to compensate for variations due to different wave length settings, and thereby maintain the response of the light detector independent of the particular wave length under study.

These and other aspects of the invention will be more fully understood from the following detailed description and the accompanying drawing in which:

FIG. 1 is a schematic drawing of one embodiment of the invention;

FIG. 2 is a fragmentary schematic drawing showing cam mechanisms for synchronizing the movements of various elements shown in FIG. 1;

FIG. 3 is a fragmentary circuit diagram of a modification of the system shown in FIGS. 1 and 2;

FIG. 4 is a fragmentary circuit diagram of another modification of the sytsem shown in FIGS. 1 and 2; and FIG. 5 is a schematic circuit diagram of the presently preferred arrangement for varying the intensity of one of the light sources.

Referring to the drawing, light from a first bulb 10 enters a first monochromator 12 and leaves the monochromator through a conventional adjustable light attenuator 14. A frequency selector dial 16, on the first monochromator is used to adjust the monochromator to transmit the desired wave length of light. A first mirror 18 is mounted on one end of a rod 20, which moves the first mirror between the solid line (first) and dotted line (second) positions. With the mirror in the solid line or first position shown in FIG. 1, light of the selected wave length from the variable light attenuator is reflected onto a thermocouple 21, one end of which is connected to a first pair of contact terminals 22, 23, and the other end of which is connected to a second pair of contact terminals 24, 25.

When the first mirror 18 is moved to the dotted line or second position shown in FIG. 1, light of the selected wave length from the variable attenuator enters a sample container 30. Light reemitted by the sample enters a second monochromator 32, which includes an adjustable dial 34 for selecting the wave length of light to be transmitted through the second monochromator. Light of the selected wave length from the second monochromator either strikes a photocell 36, or else is blocked from striking the photocell by a second mirror 38, which is blackened on the side facing the second monochromator and reflective on the opposite side. The second mirror is connected to one end of a rod 40 which moves the mirror 38 (as described in detail below) between the solid line (first) position and the dotted line (second) position shown in FIG. 1.

Light from a second light bulb 42 passes through a first filter 44, which forms a substantially monochromatic beam 45 that is intermittently directed on the thermocouple 21, depending on the position of a first light baffle 46 connected to one end of a rod 48 so the first light baffle can be moved between the solid line (first) position and the dotted line (second) position shown in FIG. 1. In one preferred form, the second light bulb 42 is a simple incandescent bulb, the output of which is kept constant by the application of a steady voltage, say from a large capacity storage battery 49.

Light from the second bulb 42 also passes through a second filter 50 so that a virtually monochromatic beam 51 of light of the same wave length characteristics as the light passing through the first filter 44 is directed by a mirror 52 through a second adjustable light attenuator 54 to the mirror 38 adjacent the photocell. A second light baffle 56 is mounted on one end of a rod 58 to be movable between the solid line (first) position and the dotted line (second) position shown in FIG. 1.

An amplifier 60 has a first input terminal 61 connected to a first pair of contacts 62, 63, and a second input terminal 64 connected to a second pair of contacts 65, 66. A pair of movable armatures 68, 69 are ganged together to serve as a reversing switch and are operated off of a movable shaft 70 as described in detail below. The output of the amplifier is connected to a first motor 72, which has a drive shaft 73 that turns a pinion gear 74 to move a rack 76 longitudinally and actuate a mechanical linkge 78 to control the amount of light passing through the first adjustable light attenuator 14.

The output of the photocell 36 is coupled through an amplifier 80 and lead 81 to a switch 82 which is moved (as described in more detail below) sequentially into electrical contact with first, second, and third terminals 86, 87, and 88, respectively. The first terminal is connected to a first conventional memory unit 90, which stores the latest voltage generated by the photocell due to light from the second bulb 42. The value of this voltage is applied to one end of a potentiometer winding 92. Second terminal 87 is connected to a second conventional memory unit 94 which stores the latest value of "dark current" developed in the photocell, i.e., the signal developed by the photocell when it is isolated from exterior light sources. The voltage stored in the second memory unit is applied to the opposite end of the potentiometer winding 92. The third terminal 88 is connected to a third conventional memory unit 96, which stores the latest value of voltage developed by the voltage cell due to light from the second monochromator. The value of the voltage developed by light from the second monochromator is fed into a conventional comparer unit 98, which also receives a signal from a movable tap 100 that is slidable along the potentiometer winding 92 by a mechanical linkage 102 driven by a servo-motor 104. When there is a difference between the signal from memory unit 96 and the movable tap 100, the servo-motor 104 is driven in a direction depending on the polarity of the difference to position the tap 100 on the winding 92 so that the difference in the comparer is brought to zero. The tap 100 moves a pen along one axis of a conventional pen recorder 106 through a mechanical linkage 108. The position of the pen along the other axis is determined through either a mechanical linkage 110 connected to the selector dial 34 on the second monochomator or through an alternate linkage 112 connected to the selector dial 16 on the first monochromator. In this way, a plot of intensity versus either irradiation wave length from the first monochromator or emitted wave length from the second monochromator is obtained for the particular sample in the container 30.

Since the response of photoelectric cells of suitable sensitivity is dependent on the wave length of light received, it is preferred to compensate for this variation by adjusting the second light attenuator 54 through a mechanical linkage 114 connected to a suitable mechanical cam 116, which in turn is driven by a mechanical linkage 118 connected to the selector dial 34 on the second monochromator. To adjust or test the proper operation of the compensating cam 116, the two monochromators are set to pass the same wave length of light, and the sample container 30 is replaced with a diffuse screen, which receives light from the first monochromator and uniformly diffuses it in all directions. The selector dials are then turned together through the band of wave length to be investigated. The shape of the compensating cam 116 is proper when the value recorded by the pen recorder is independent of the wave length setting of the selector dials on the monochromator.

The various positions of the light baffles and mirrors are controlled by a cam drive motor 120 (FIG. 2) which turns a common cam shaft 122 at a uniform speed. A first cam 124 on the shaft 122 reciprocates the rod 20 connected to the first mirror 18 so the mirror moves between its first and second position, at a suitable rate, say about 15 times a second. A second cam 126 reciprocates the rod 40 connected to the mirror 38 at exactly the same rate that the first mirror is cycled. A third cam 128 reciprocates the rod 48 between its first and second positions at the same rate as rods 20 and 40. A fourth cam 140 actuates linkage 70 to move the reversing switch armature between the solid and dotted line position at the same rate previously mentioned. The fifth cam 142 operates rod 58 to move light baffle 56 into the dotted line position to shroud the photoelectric cell momentarily from all light when the baffles and mirrors are in the solid line position shown in FIG. 1.

Switch 82 is connected to the end of the cam shaft 122 and insulated from it by an insulator 144. Thus, as the cam shaft 122 rotates, the cams reciprocate the mirrors and light baffles. The shaft also rotates the switch 82 so that it sequentially contacts terminals 86, 87, and 88.

In operation, after the system is calibrated, a sample is disposed in the sample container 30 and the lights are turned on. With the baffle and mirrors in the solid line position shown in FIG. 1, light from the first monochromator strikes the thermocouple and light from the second light 42 is directed to the photoelectric cell. The switch 82 is in contact with terminal 86 so that the voltage developed by the photoelectric cell due to light from the second light bulb 42 is fed into the first memory unit 90.

The cam motor 120 is turned on and, as cam shaft 122 rotates, light baffle 56 is moved momentarily to the dotted line position to shroud the photoelectric cell from all light, and switch 82 moves into contact with terminal 87 so that the voltage due to "dark current" is fed into the second memory unit 94. The remaining movable elements in the system remain in the solid line positions in this stage of operation.

As cam shaft 122 continues to rotate, the light baffle 56 returns to its solid line position, and the first mirror 18 moves to the dotted line position so that light from the first monochromator strikes the sample and is re-emitted into the second monochromator. The mirror 38 moves up to the dotted line position so that light from the second monochromator now falls on the photocell. Switch 82 is now in contact with terminal 88 so that the voltage developed in the photoelectric cell due to light from the sample is registered in the third memory unit 96.

The voltage from memory unit 96 is compared in the comparer 98 with the voltage at tap 100. If there is a difference, the servo-motor 104 moves the tap 100 until the difference in the comparer is zero. The position of the tap is indicated through linkage 108 on one axis of the pen recorder as a record of the intensity of light emitted by the sample at the particular wave length transmitted by the second monochromator. When it is desired to record intensity of emitted light as a function of emitted light wave length for a fixed irradiation wave length, linkage 110 is coupled between the selector dial 34 on the second monochromator and the pen recorder to control the other axis of recording. Thus, as selector dial 34 is turned, the recorder pen moves along one axis corresponding to light wave length, and along the other axis in proportion to the ratio of the light striking the photocell from the second monochromator to the intensity of the light striking the photocell from the second light bulb 42. In effect, the comparer and its associated elements measure the ratio of the signal voltage minus "dark current" voltage to the reference voltage minus "dark current" voltage. Since the ratio of the light from the first monochromator to the ratio of the light from the second light bulb 42 is held constant, any change in the ratio developed by the signal is a measure of the effect of the sample on the light passing from the first monochromator to the second monochromator, regardless of how the intensity of the light from the two light bulbs may fluctuate.

As the cam shaft 122 rotates, the rod 70 is reciprocated so that the reversing switch moves from the solid to the dotted line positions as the mirrors 18 and 38, and light baffle 46 are moved between the solid and dotted line positions. Thus, the output from the thermocouple 21 to the amplifier 60 is reversed periodically and in synchronism with the movable mirrors and light baffle 46. The thermocouple is substantially insensitive to light wave length. As long as the light intensities striking the thermocouple from the first monochromator and from the second light bulb are the same, or remain at the same ratio, no signal is developed from the amplifier to drive motor 72. However, a signal is developed if one of the light bulbs changes its intensity. For example, if the intensity of the light from the first monochromator increases due to an increase in line voltage which powers the first light bulb, there is an increased amount of radiation on the thermocouple when the mirrors and light baffles are in the solid line positions shown in FIG. 1. This results in an unbalanced signal of one polarity applied to the amplifier, which in turn drives the motor to close the adjustable light attenuator 14, and restore the balance between the light from the first monochromator and the light from the second light bulb. However, if the intensity of the light from the second light bulb should increase, the temperature of the thermocouple is increased when the reversing switch is in the dotted line position so that a signal of opposite polarity is applied to the amplifier which then drives motor 72 in the opposite direction to open the adjustable light attenuator 14 and permit more light from the monochromator to strike the thermocouple and restore the constant ratio. Similarly, the adjustable light attenuator 14 opens if the light bulb 10 tends to dim, and closes if the light bulb 42 tends to dim. Thus the ratio of the light from the first monocromator to the intensity of the light from the second source is maintained constant, regardless of fluctuations in line voltage, age characteristics of the light bulbs, etc.

The system described above is used for measurement of the relative intensities of light at different wave lengths from any light source, i.e., as an emission spectrometer, with only minor modification. For this type of operation, the light bulb 10 and the first monochromator 12 are replaced by the unknown light source (not shown) to be measured. The sample container 30 is removed, and a diffuse screen 150 is moved from the solid to the dotted line position shown in FIG. 1 so that light from the unknown source strikes the diffuse screen and a portion of it is reemitted into the second monochromator. The system then records the ratio of light of selected wave length from the unknown source to the intensity of the secondary source 42, corrected for wave length dependence of the photoelectric cell and second monochromator through the correcting cam 116, linkages 114, 118 and adjustable light attenuator 54. The final recording is not affected by changes in either the intensity of the second light bulb 42 or the unknown source, and therefore is a true recording of the relative energy or wave length distribution of the unknown light source.

If desired, the adjustable cam system 116 is deliberately adjusted to yield any arbitrary non-uniform function in response to wave length selection as indicated by the position of selector knob 34. For example, the adjustable cam may be set to yield luminous efficiency of the unknown source or sample by adjusting it to make the operation of the adjustable light baffle 54 produce a recording which is proportional to the sensitivity of the average eye. Of course, the adjustable cam 116 need not be mechanical, but can use the equivalent electronic or potentiometric system, such as controlling the appropriate output of the memory units 90, 94, and 96, as shown in FIGS. 3 and 4.

In the modification shown in FIG. 3, the cam drive linkage 114 is mechanically connected to a movable tap 150 which slides along a potentiometer winding 152 connected across the outputs of the second and third memory units 94, 96. The winding 152 is preferably an arbitrary function of wave length to compensate for sensitivity detection of the photo cell or to yield luminous efficiency by producing a recording which is proportional to the sensitivity of the average eye. Preferably, the winding 152 is easily replaceable so that any type of arbitrary function in response to setting of the wave length dial on the second monochromator 32 may be used.

The signal picked up by the movable tap 150 is fed into the comparer 98, and the remainder of the system is described with respect to that shown in FIGS. 1 and 2.

FIG. 4 shows an alternate embodiment of the modification of FIG. 3. In the system of FIG. 4, the potentiometer winding 54, which is wound to provide any arbitrary function of setting of dial 34, is connected across the output of the first and second memory units. A movable tap 156 is driven along winding 154 by the mechanical linkage 114 on the cam box 116, and supplies a signal to one end of winding 92, the other end of which is connected to the second memory output. The remainder of the circuit system is the same as that shown in FIGS. 1 and 2.

FIG. 5 shows the presently preferred arrangement for keeping the ratio of the two light intensities constant. The output of the amplifier 60 is applied to the base of a transistor 130, which controls the amount of power supplied from a source 132 to the second light bulb 42. In this arrangement the motor 72, drive shaft 73, pinion 74, rack 76, and adjustable light attenuator 14 are omitted from the system shown in FIG. 1.

In using the circuit of FIG. 5, if the light bulb 10 gets brighter, the amplifier 60 develops a signal to make the transistor more conductive. Conversely, if light bulb 10 dims the transistor is biased to be less conductive, and thereby keep the ratio of the intensities of the two light sources constant.

I claim:

1. Radiation compensating apparatus comprising a first source of radiation, a second source of radiation, means for changing the intensity of the radiation from one of the sources, first means for sensing the respective intensities of the two sources, means responsive to the sensing means for automatically changing the intensity of the radiation from the said one source to keep the ratio of the intensities of the two sources substantially constant, a sample container disposed to hold a sample in a position to receive radiation from one of the sources and emit radiation in response to that received from the said one source, and second means for sensing the ratio of the intensity of radiation from the sample to the intensity of the radiation from the other source.

2. Radiation compensating apparatus comprising a first source of radiation, means for changing the intensity of the radiation from the first source, a second source of radiation, means for sensing the respective intensities of the two sources, means responsive to the sensing means for automatically changing the intensity of the radiation from the first source to keep the ratio of the intensities of the two sources substantially constant, a sample container disposed to hold a sample in a position to receive radiation from the first source and emit radiation in response to that received from the said first source, and second means for sensing the ratio of the intensity of radiation from the sample to the intensity of the radiation from the other source.

3. Radiation compensating apparatus comprising a first source of substantially monochromatic radiation, means for changing the intensity of the radiation from the first source, a second source of radiation, a filter disposed in the path of radiation from the second source to obtain a substantially monochromatic beam from the second source, means for sensing the respective intensities of said monochromatic radiation from the two sources, means responsive to the sensing means for automatically changing the intensity of the radiation from the first source to keep the ratio of the intensities of the two sources substantially constant, a sample container disposed to hold a sample in a position to receive radiation from the first source and emit radiation in response to that received from the said first source, and second means for sensing the ratio of the intensity of radiation from the sample to the intensity of the monochromatic beam from the second source.

4. Radiation compensating apparatus comprising a first source of radiation, means for changing the intensity of the radiation from the first source, a second source of radiation, means for sensing the respective intensities of the two sources, means responsive to the sensing means for automatically changing the intensity of the radiation from the first source to keep the ratio of the intensities of the two sources substantially constant, a sample container disposed to hold a sample in a position to receive radiation from the first source and emit radiation in response to that received from the said first source, second means for sensing the ratio of the intensity of the radiation from the sample to the intensity of the radiation from the second source, means for alternately irradiating the first and second sensing means with radiation from the two sources.

5. Radiation compensating apparatus comprising a first source of radiation, means for changing the intensity of the radiation from the first source, a second source of radiation, means for sensing the respective intensities of the two sources, means responsive to the sensing means for automatically changing the intensity of the radiation from the first source to keep the ratio of the intensities of the two sources substantially constant, a sample container disposed to hold a sample in a position to receive radiation from the first source and emit radiation in response to that received from the said first source, second sensing means disposed to receive radiation from the sample and from the second source for sensing the ratio of the intensity of radiation from the sample to the intensity of radiation from the second source, means for varying the frequency of the radiation traveling from the sample to the second sensing means, and means responsive to the said frequency varying means for changing the intensity of the radiation traveling from the second source to the second sensing means.

6. Radiation compensating apparatus comprising a first source of radiation, a second source of radiation, one of the sources being a light bulb, a power source connected to the light bulb, means for varying the amount of power supplied to the light bulb to change its radiation output without changing the radiation from the second source, means for sensing the relative intensities of the two radiation sources, and means responsive to the sensing means for varying the power supplied to the light bulb to change its radiation output and keep the ratio of the intensities of the two sources substantially constant.

7. Radiation compensating apparatus comprising a first source of radiation, a second source of radiation, means for changing the intensity of radiation from one of the sources, first means for sensing the respective intensities of radiation from the two sources, means responsive to the first sensing means for automatically changing the intensity of the radiation from the said one source to keep the ratio of the radiation from the two sources substantially constant, a sample container disposed to hold a sample in a position to receive radiation from one of the sources and emit radiation in response to that received from the said one source, second sensing means disposed to receive radiation from the sample and from the other source for sensing the ratio of the intensity of radiation from the said other source, means for varying the frequency of the radiation traveling from the sample to the second sensing means, and means responsive to the said frequency varying means for changing the intensity of radiation of one of the beams striking the second sensing means.

8. Radiation compensating apparatus comprising a first source of radiation, a second source of radiation, first means for varying the amount of radiation from one of the sources, first means for sensing the respective intensities of radiation from the two sources, means responsive to the first sensing means for automatically changing the intensity from the said one source to keep substantially constant the ratio of radiation intensity from the two sources, a sample container disposed to hold a sample in a position to receive radiation from one of the two sources and emit radiation in response to that received from the said one source, second sensing means having an adjustable output disposed to receive radiation from the sample and from the other source for sensing the ratio of radiation intensity from the sample and from the other source, means for changing the frequency of radiation striking the sample, and means responsive to the frequency changing means for changing the output of the second sensing means.

References Cited by the Examiner
UNITED STATES PATENTS

| | | | |
|---|---|---|---|
| 1,806,197 | 5/1931 | Hardy | 250—204 X |
| 1,806,198 | 5/1931 | Hardy | 250—204 X |
| 2,690,511 | 9/1954 | Elion | 250—205 |
| 2,900,866 | 8/1959 | Coates et al. | 88—14 |

JEWELL H. PEDERSEN, *Primary Examiner.*